United States Patent [19]
Potter et al.

[11] Patent Number: 5,975,454
[45] Date of Patent: Nov. 2, 1999

[54] STRAP WINDER

[75] Inventors: Lawrence L. Potter, Prophetstown; Ronald Kelly, Tampico, both of Ill.

[73] Assignee: Quick Winch Products, Inc., Tampico, Ill.

[21] Appl. No.: 09/168,230

[22] Filed: Oct. 7, 1998

Related U.S. Application Data

[63] Continuation-in-part of application No. 08/890,520, Jul. 9, 1997.

[51] Int. Cl.$^6$ .................................................. B65H 75/30
[52] U.S. Cl. ......................... 242/395; 242/397; 242/398; 242/405; 242/407
[58] Field of Search ..................................... 242/395, 397, 242/398, 405, 405.3, 407, 395.1

[56] References Cited

U.S. PATENT DOCUMENTS

| | | |
|---|---|---|
| D. 299,618 | 1/1989 | Drought et al. ..................... D8/359 |
| 850,236 | 4/1907 | Maguire . |
| 1,199,790 | 10/1916 | Holcomb . |
| 2,217,323 | 10/1940 | Sackett . |
| 2,314,504 | 3/1943 | Lifschultz . |
| 2,536,875 | 1/1951 | Dalrymple . |
| 2,571,175 | 10/1951 | Williams et al. . |
| 2,602,604 | 7/1952 | Russell et al. . |
| 2,765,128 | 10/1956 | Barth . |
| 2,866,436 | 12/1958 | Swain et al. . |
| 3,001,738 | 9/1961 | Quenot . |
| 3,261,567 | 7/1966 | Quenot . |
| 3,731,887 | 5/1973 | Wheeler . |
| 3,830,443 | 8/1974 | Quenot . |
| 3,934,834 | 1/1976 | Gick et al. . |
| 3,944,161 | 3/1976 | Kauf . |
| 3,954,226 | 5/1976 | Pickering . |
| 4,007,887 | 2/1977 | Vice . |
| 4,251,038 | 2/1981 | Gename . |
| 4,266,740 | 5/1981 | Ramos et al. . |
| 4,311,288 | 1/1982 | Galland . |
| 4,390,141 | 6/1983 | Webster . |
| 4,796,827 | 1/1989 | Munt, III et al. . |
| 4,813,625 | 3/1989 | Takeda . |
| 5,615,844 | 4/1997 | Bosch . |

FOREIGN PATENT DOCUMENTS

WO 92/01623  2/1992  WIPO .

Primary Examiner—Donald P. Walsh
Attorney, Agent, or Firm—Wood, Phillips, VanSanten, Clark & Mortimer

[57] ABSTRACT

A hand held strap winder has an oval, planar base with a hand grip, a hub on which the strap is wound and a strap guide aligned on the major axis of the oval base.

21 Claims, 5 Drawing Sheets

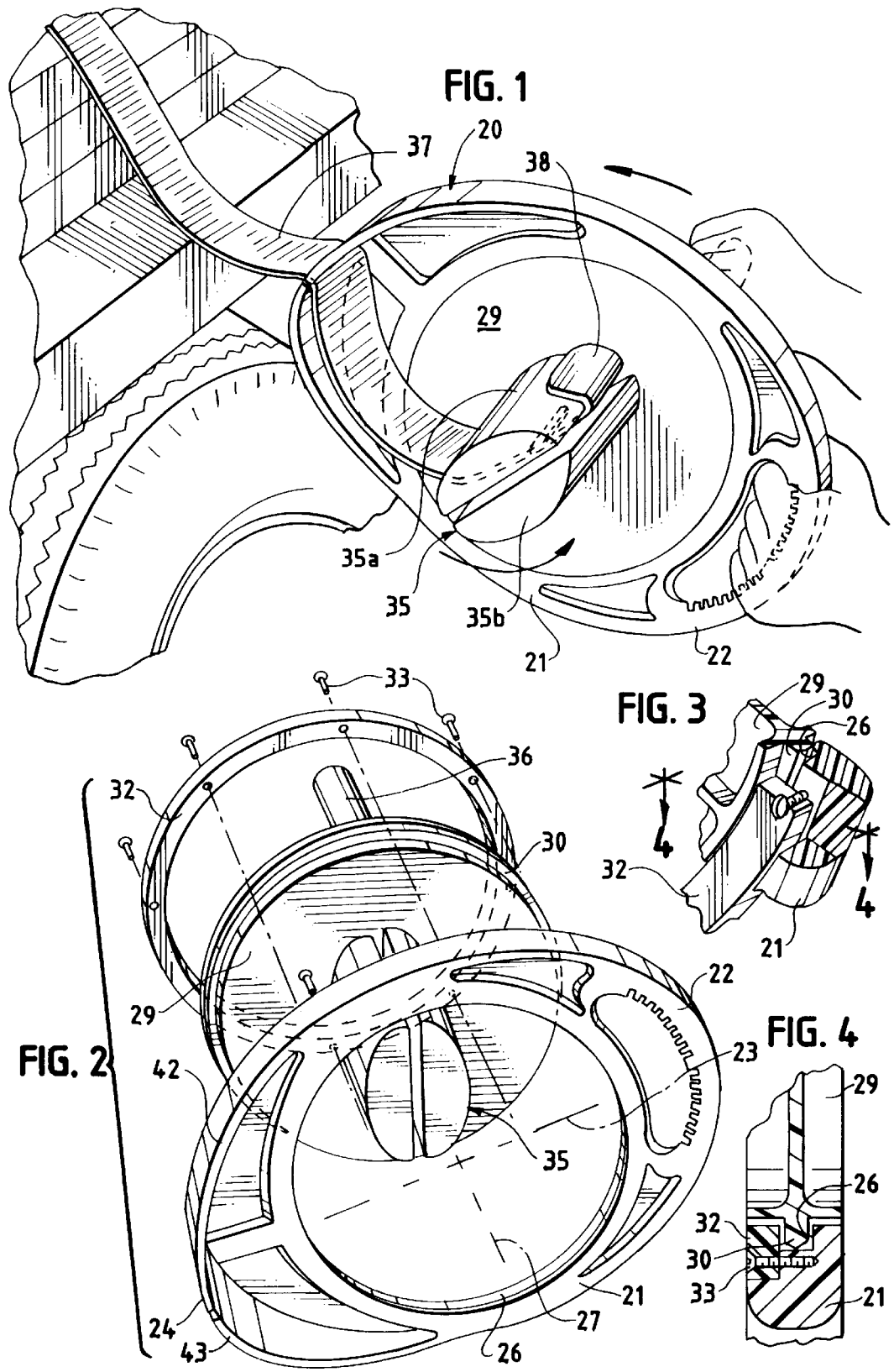

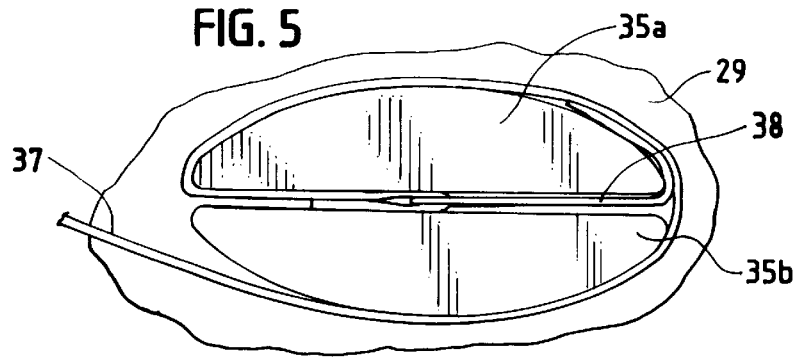
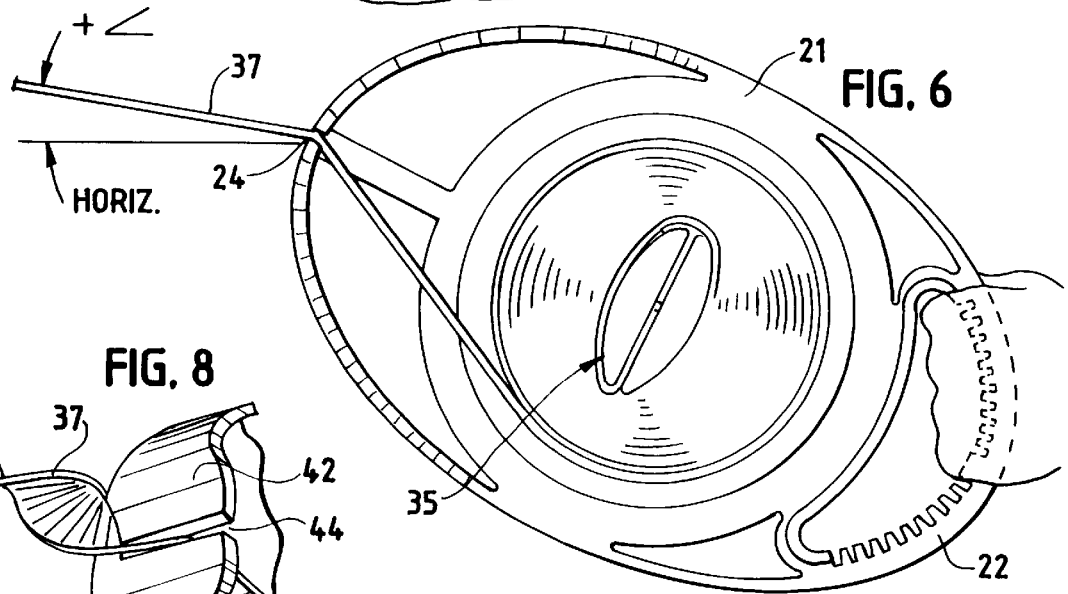
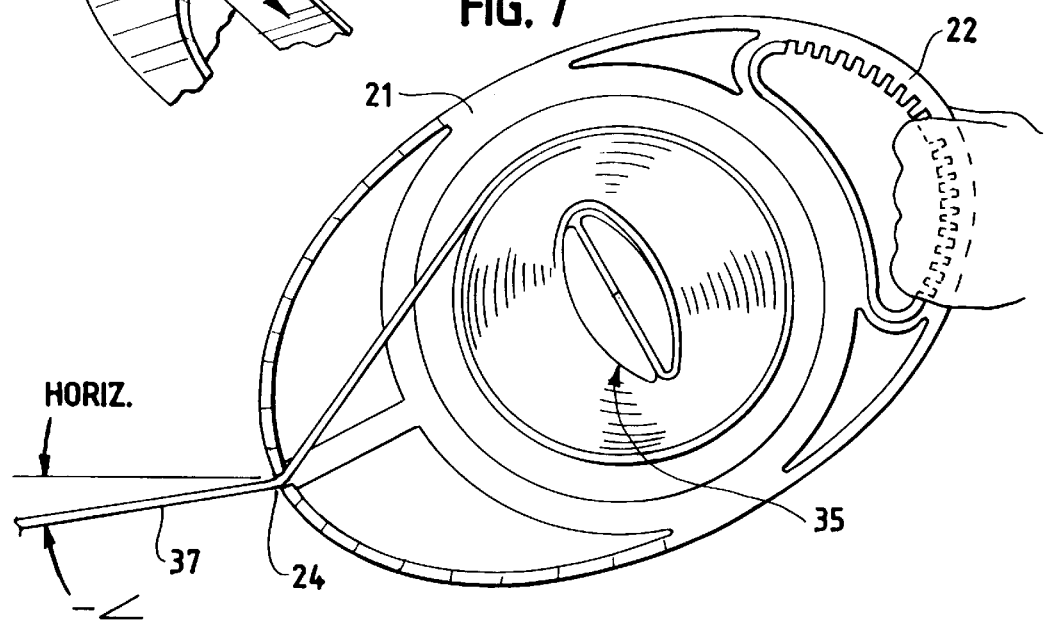

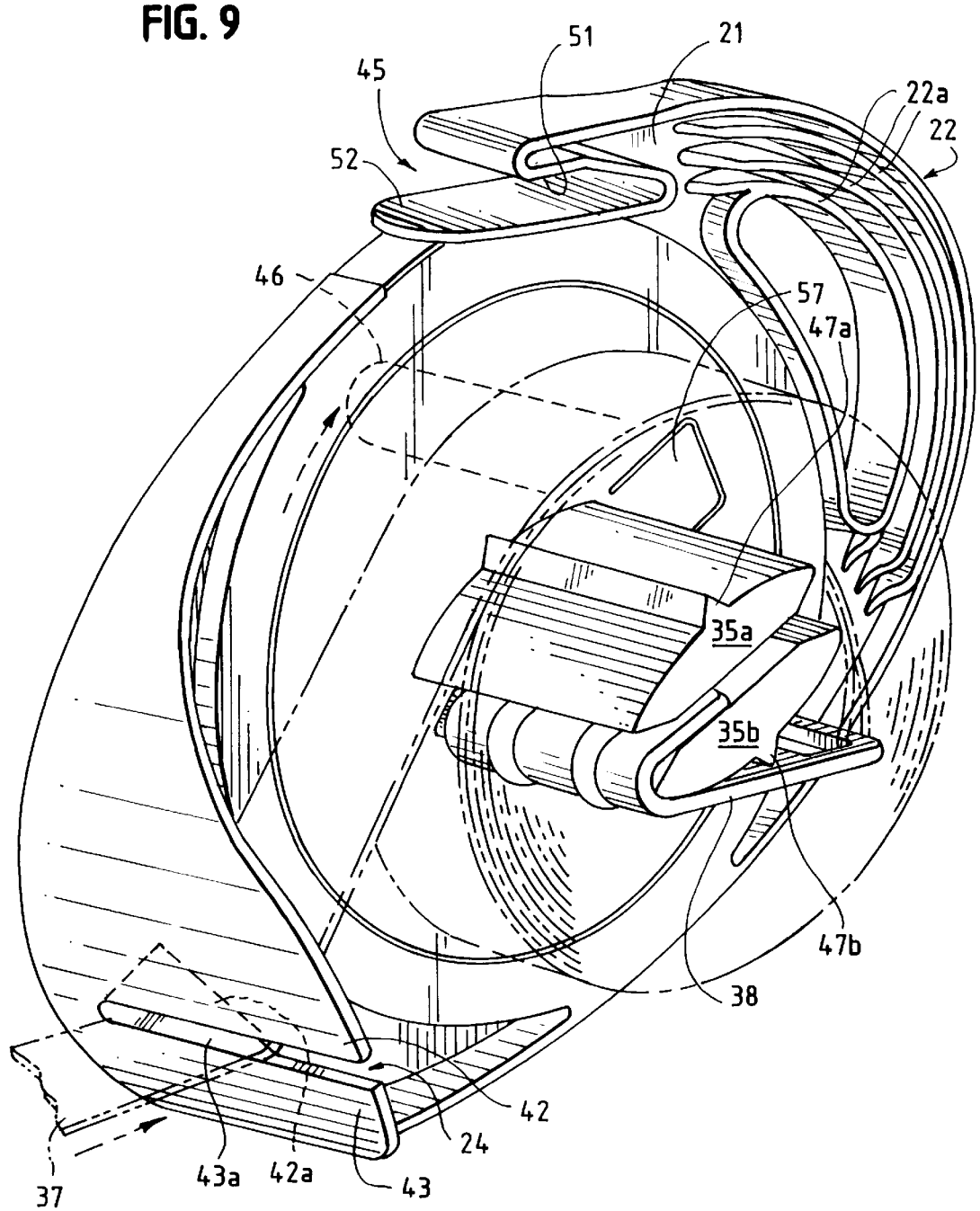

_
STRAP WINDER

CROSS-REFERENCE TO RELATED APPLICATION

This application is a continuation-in-part of Potter Ser. No. 08/890,520, filed Jul. 9,1997.

STATEMENT REGARDING FEDERALLY SPONSORED RESEARCH OR DEVELOPMENT

Not applicable.

BACKGROUND OF THE INVENTION

Straps used to secure loads on trucks are typically woven of a fabric, as nylon, and are generally two, three or four inches wide. The straps may be as long as 15 or 20 feet. After a load is removed, the truck driver must secure the straps for reuse when the truck is again loaded. The straps are generally secured by winding each of them in a flat coil.

Several strap winders have been proposed:

| | |
|---|---|
| Pickering | U.S. Pat. No. 3,954,226 |
| Vice | U.S. Pat. No. 4,007,887 |
| Ramos et al. | U.S. Pat. No. 4,266,740 |
| Galland | U.S. Pat. No. 4,311,288 |
| Webster | U.S. Pat. No. 4,390,141 |

These strap winders have not been widely adopted and in practice many drivers wind the straps by hand, a time-consuming and non-productive activity.

BRIEF SUMMARY OF THE INVENTION

This invention is concerned with an improved strap winder.

More particularly, the strap winder has a base, a hand grip on the base, a rotatable hub on one side of the base to receive the strap to be wound, a manual crank handle on the other side of the base for rotating the hub to wind the strap and a guide on the base for directing the strap to the hub as the hub is rotated, the grip, hub and strap guide being aligned.

Another feature of the strap winder is that the base is planar and has a central opening therethrough defined by a circular seat with a circular disk rotatably mounted on the seat and exposed on both sides of the base. The hub is at the center of one side of the disk and the manual crank handle on the other side of the disk is offset from the disk center.

A further feature is that the hand grip is arcuate and has a length to accommodate to a first hand position at the upper end of the hand grip with the guide facing upwardly to receive a strap from above, and a second hand position at the lower end of the hand grip with the guide facing downwardly to receive a strap from below.

Yet another feature of the winder is that base is molded plastic and the strap guide comprises two integral fins extending from the planar base on the same side as the hub and having spaced apart surfaces defining a strap slot on a line extending through the hand grip and hub; and the spaced apart slot-defining surfaces have square edges which engage the strap, eliminating kinks and curls as the strap is drawn through the guide.

Another feature of the strap winder is that the manual crank handle is positionable in an extended position for rotating the hub to wind the strap thereon and in a folded position with the crank handle folded in the plane of the base. The disk has an elongate recess extending radially inward from the periphery of the disk to receive the crank handle in the folded position.

An additional feature of the strap winder is that a hook is located on the periphery of the base for hanging the strap winder on a truck rub rail. The base has an oval configuration with major and minor axes and the strap guide is aligned along the major axis. The hook is located on the periphery of the base between the intersections of the axes with the base periphery and remote from the strap guide so that the guide is directed downwardly to receive a strap from below when the strap winder is hung on the rub rail.

And a further feature of the strap winder is that a pair of ribs are located on opposite sides of the hub parallel to the longitudinal axis of the hub for spacing the strap to be wound from the surface of the hub. The hub has two spaced apart sections with arcuate outer surfaces. A rib is centered on each of the arcuate surfaces.

BRIEF DESCRIPTION OF THE DRAWINGS

FIG. 1 is a perspective view of the strap winder in use;

FIG. 2 is an exploded perspective view of the strap winder;

FIG. 3 is an enlarged fragmentary perspective of the base, seat, disk and retaining ring;

FIG. 4 is a section taken along line 4—4 of FIG. 3;

FIG. 5 is a fragmentary side view showing a strap with a hook, the strap being partially wound on the hub;

FIGS. 6 and 7 are side views showing the strap winder held to wind a strap from above and below the winder position, respectively;

FIG. 8 is a fragmentary perspective showing the strap guide which straightens the strap as it is wound;

FIG. 9 is a perspective view of a second embodiment of the strap winder;

DETAILED DESCRIPTION OF THE INVENTION

Figure 10:
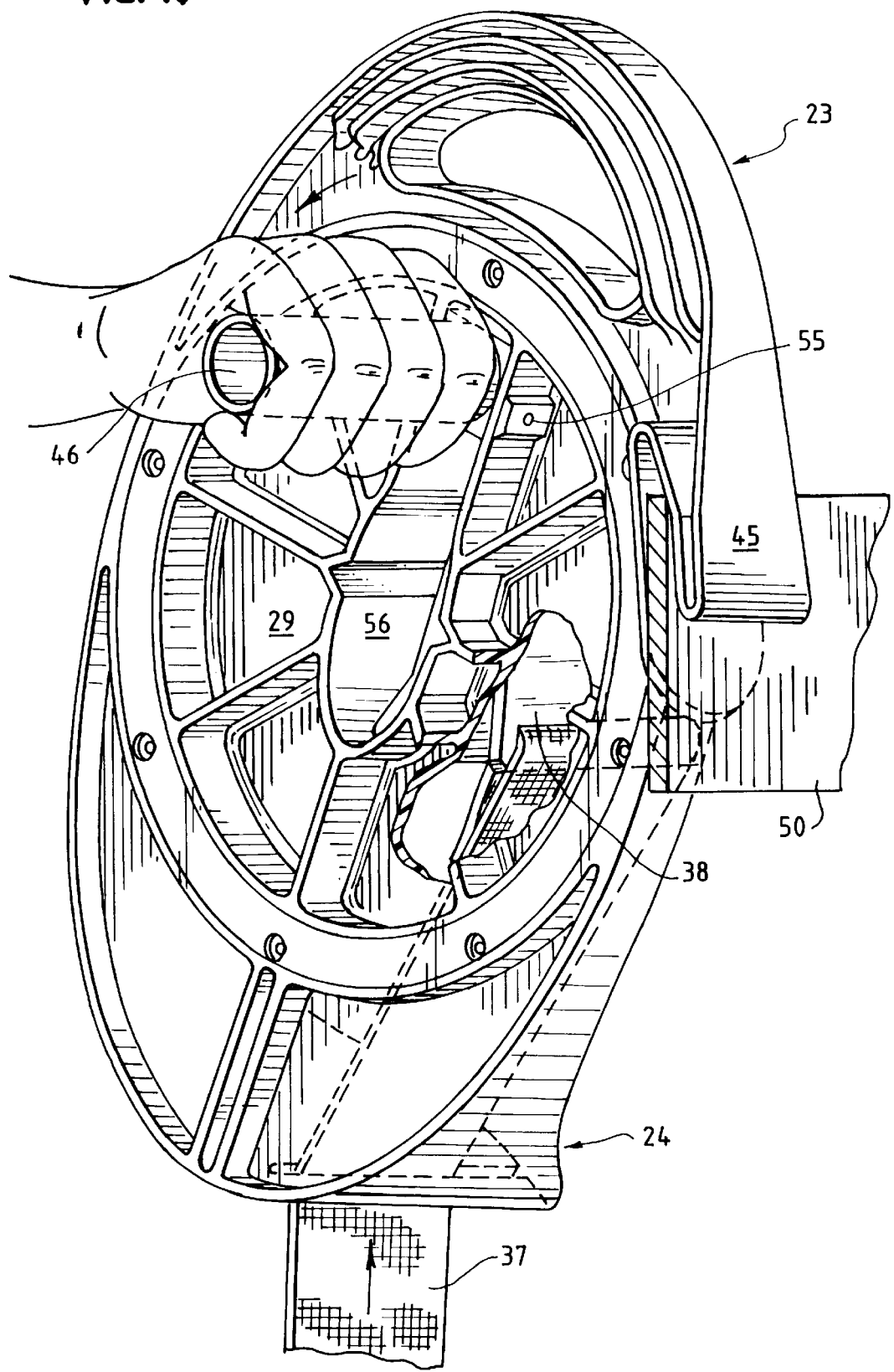
FIG. 10 is a perspective view of the strap winder in use while hung from a truck rub rail.
Figure 11:
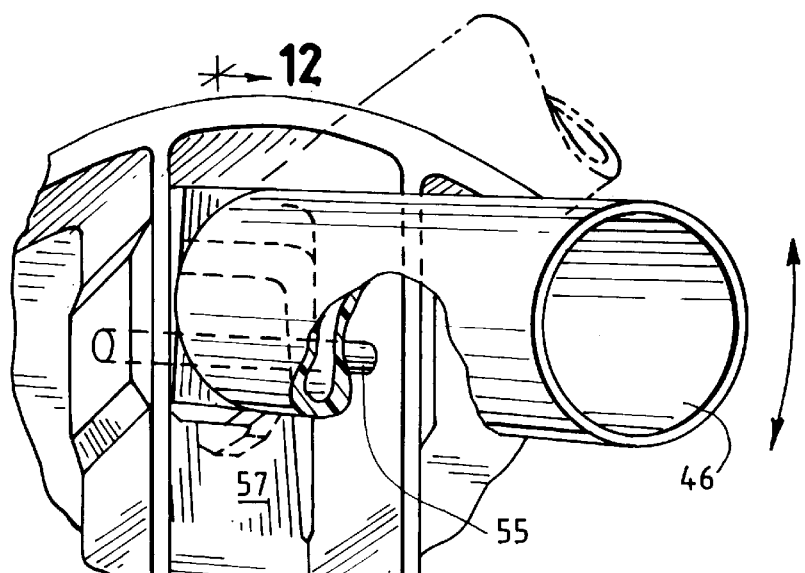
FIG. 11 is a fragmentary perspective of the disk showing the crank handle connection to the disk.

The strap winder 20 has a planar oval base 21, FIGS. 1 and 2, with a hand grip 22 at one end of the major axis 23 of the base. A strap guide 24 is at the other end of major axis 23. A circular opening in the base is defined by a seating surface 26, the center of the circular opening being at the intersection of major axis 23 and minor axis 27 of the base. A rotatable circular disk 29 has a peripheral flange 30 held on the seat 26 by a retaining ring 32, secured by screws 33. Disk 29 has a hub 35 at the center on one side and a manual crank handle 36 adjacent the disk periphery on the other side. The hub 35 has two spaced apart sections 35a, 35b, with arcuate outer surfaces.

An end of the strap 37 to be wound is engaged with the hub 35. The strap winder is held by the user in one hand and the disk 29 turned with the other hand drawing the strap through guide 24, winding the strap on the hub.

Strap 37 typically has a hook 38 at one end. The body of the hook fits in the space 40 between hub sections 35a, 35b, and the end of the hook engages the arcuate outer surface of the hub section 35a, as shown in FIGS. 1 and 5. Where the strap 37 is wound from an end without a hook 38, the end of the strap is inserted in the space between hubs sections 35a and 35b, and a couple of turns taken around the hub, anchoring the strap.

The strap winder 20 is symmetrical and may be held in either hand with the crank handle 36 positioned to be turned by the other hand, winding the strap on the hub.

When the strap is completely wound, it is removed from the hub and may be stored until again needed.

Arcuate hand grip 22 is sufficiently long that the strap winder may be held in different angular attitudes to facilitate winding of the strap whether it is extended over a top of a load above the user or on the ground below the user, see FIGS. 6 and 7. In FIG. 6, the user's hand is at the upper end of the hand grip with the strap guide 24 directed upwardly to receive a strap from above. In FIG. 7, the lower end of the hand grip is held with guide 24 directed downwardly to receive strap 37 from below.

The base 21, disk 29 and retaining ring 32 are preferably molded of plastic as a fiberglass reinforced polypropylene or ABS resin.

The strap guide 24 is formed by two fins 42, 43, molded integrally with the base, FIGS. 2 and 8. The slot 44 which forms the strap guide is formed by spaced apart surfaces with square edges which engage the strap being wound. These edges contribute to the ability of the strap guide to unroll kinks and twists in the strap as it is drawn through the guide to hub 35. The nominal thickness of strap 37 is 1/8–3/16 inch. A spacing of the order of 9/32 inch between the surfaces of the fins which define the web guide slot 44 has been found optimum for straightening and guiding the strap without causing excessive friction.

A second embodiment of the strap winder, shown in FIGS. 9–12, differs from the winder of FIGS. 1–11 in having a mounting hook 45, a folding crank handle 46 and a pair of ribs 47a, 47b, that run the along the length of the hub 35, are centered on the arcuate outer surface of each hub section 35a and 35b.

Load straps are commonly used to secure a load on a flat bed truck; and such trucks typically have a rub rail which extends around and is spaced from the edge of the truck bed. The winder of FIGS. 9 and 10 with hook 45 may be hung from a rub rail 50, FIG. 10. Hook 45 is located on the periphery of base 21 at a point midway between the major and minor axes 23, 27 and adjacent one end of handle 22 and remote from strap guide 24. Crank handle 46 is on the right side of the winder, as observed by the user, for turning the disk 29 with the right hand and guide 24 is directed downwardly to retrieve a strap on the ground. The hook opening is tapered, as from one-half to one-quarter inch, for a wedge fit with rub rail 50. The hook is define by planar surfaces 51, 52 for stability on the rub rail.

Figure 12:
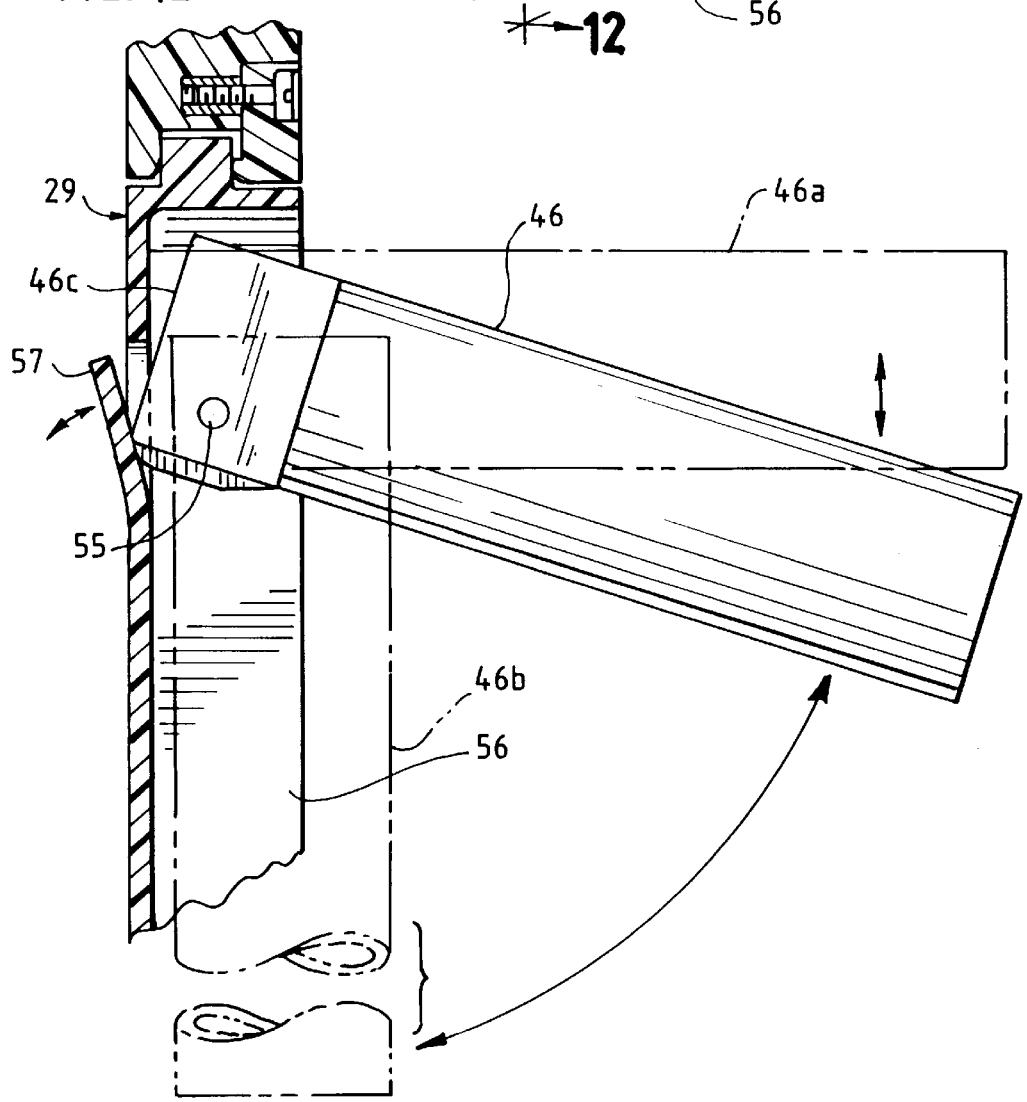
FIG. 12 is a section taken along line 12—12 of FIG. 11.

Crank handle 46 is mounted on a pin 55, at the periphery of disk 29, for rotation between extended and folded positions 46a, 46b, respectively, shown in broken lines in FIG. 12. Crank handle in the extended position 46a is at right angles to disk 29 for turning the disk to wind a strap 37. Crank handle 46b in the folded position is received in a recess 56 extending radially inward of circular disk 29. A flexible, resilient tab 57 in disk 29 engages the end 46c of the crank handle, adjacent pin 55, holding the crank handle in either the extended for folded position.

The ribs 47a, 47b on hub sections 35a, 35b have a triangular cross section. The ribs space the wound strap 37 from much of the hub surface, reducing friction between the strap and hub so that the coiled strap may readily be slipped off the hub. Hook 38, as shown in FIG. 9, preferably has its hooked end between the hub sections 35a, 35b. The body of hook 38 rests on rib 47b so that the hook is not likely to twist as strap 37 is initially wound.

Hand grip 22 is formed by a plurality of spaced apart, concentric, arcuate ribs 22a which extend at right angles to the plane of base 21. The engagement of the user's hand with the edges of the ribs 22a minimizes the tendency of the hand grip to turn as the winder is used; and yet provides a comfortable gripping surface.

Guide fins 42, 43 are strengthened by triangular braces 42a, 43a molded in the plastic base.

We claim:

1. A hand-held winder for an elongate strap, comprising:
   a planar base;
   an elongate hand grip on said base and in the plane thereof;
   a rotatable hub on one side of said base to receive the strap to be wound;
   a manual crank handle on the other side of said base for rotating said hub to wind the strap thereon; and
   a guide on said base for directing the strap to the hub as the hub is rotated, said hand grip, hub and strap guide being aligned and the length of the hand grip is transverse to the common line of the handgrip, hub and guide.

2. The strap winder of claim 1 in which said base is a molded plastic and the strap guide comprises two integral fins extending from the planar base on the same side as the hub and having spaced apart surfaces defining a strap slot.

3. The strap winder of claim 2 in which the spaced apart strap guide surfaces on said fins have square edges which engage the strap being wound.

4. The strap winder of claim 2 in which the surfaces are spaced apart a distance of 9/32 inch.

5. A hand held winder for an elongate strap, comprising:
   a base;
   a hand grip on said base;
   a rotatable hub on one side of said base to receive the strap to be wound;
   a manual crank handle on the other side of said base for rotating said hub to wind the strap thereon; and
   a guide on said base for directing the strap to the hub as the hub is rotated, said hand grip, hub and strap guide being aligned, and said hand grip having an arcuate shape and a length to accommodate a first hand position at the upper end of the hand grip with the guide directed upwardly to receive a strap from above, and a second hand position at the lower end of the hand grip with the guide directed downwardly to receive a strap from below.

6. A hand held winder for an elongate strap, comprising:
   a planar base with a central opening therethrough defined by a circular seat;
   a circular disk rotatably mounted on said seat and exposed on both sides of said planar base;
   a hub at the center of one side of said disk;
   a manual crank handle on the other side of said disk and offset from the center thereof; and
   a hand grip on the base.

7. The strap winder of claim 6 in which said base has an oval configuration with major and minor axes, the center of said circular seat being substantially at the intersection of said axes, and said hand grip is arcuate and at the periphery of said base on said major axis.

8. The strap winder of claim 7, including a guide on said base for directing the strap to the hub as the hub is rotated, the hand grip, hub and guide being aligned on the major axis of the oval base.

9. The strap winder of claim 8 in which said hand grip has a length to accommodate a first hand position at the upper end of the handle with the guide facing upwardly to receive a strap from above, and a second hand position at the lower end of the hand grip with the guide facing downwardly to receive a strap from below.

10. The strap winder of claim 7 in which the hand grip comprises a plurality of arcuate ribs extending at right angles to the plane of the base.

11. The strap winder of claim 6 in which said base and said disk are a fiberglass reinforced plastic.

12. The strap winder of claim 6 in which the hand grip comprises a plurality of ribs extending at right angles to the plane of the base.

13. A strap winder for an elongate strap comprising:
   a planar base with a central opening therethrough defined by a circular seat;
   a circular disk rotatably mounted on said seat, exposed on both sides of said planar base;
   a hub at the center of one side of said disk; and
   a manual crank handle pivotally attached on the other side of said disk for movement between an extended position offset from the center of the disk for rotating said hub to wind the strap thereon and a folded position with the crank handle is folded against the disk.

14. The strap winder of claim 13 including a spring for urging the handle toward either the extended or folded position.

15. The strap winder of claim 14 in which said spring is a resilient tab on the disk.

16. The strap winder of claim 13 in which the disk has an elongate radial recess which receives the handle in the folded position.

17. A strap winder for an elongate cargo strap, usable on a truck having a cargo bed with a peripheral rub rail, comprising:
   a base;
   a hook on the periphery of said base having a first surface and a second opposing surface defining an opening for hanging the strap winder on the truck rub rail wherein the opposing surfaces are nonparallel for a wedge fit with said rub rail;
   a rotatable hub on one side of said base to receive the strap to be wound;
   a manual crank handle on the other side of said base for rotating said hub to wind the strap thereon; and
   a guide on said base for directing the strap to the hub as the hub is rotated.

18. The strap winder of claim 17, in which the base has an oval configuration with major and minor axes, the strap guide and hub being aligned along the major axis and the hook being positioned on the periphery of the base between the intersections of the axes with the base periphery, remote from the strap guide so that the guide is directed downwardly to receive a strap from below.

19. A strap winder for an elongate strap, comprising:
   a rotatable hub to receive the strap to be wound, the hub having a cylindrical surface;
   a crank for rotating the hub; and
   ribs on the hub for spacing the wound strap from the hub surface.

20. The strap winder of claim 19 in which the hub has a generally oval configuration with major and minor axes, said ribs being located on the minor axis.

21. The strap winder of claim 19 in which the hub comprises two spaced apart sections with arcuate outer surfaces, a rib being at the center of each outer surface.

* * * * *